(12) United States Patent  
Moon et al.

(10) Patent No.: US 8,154,684 B2
(45) Date of Patent: Apr. 10, 2012

(54) LIGHT EMISSION DEVICE AND DISPLAY DEVICE USING THE LIGHT EMISSION DEVICE AS A LIGHT SOURCE

(75) Inventors: Dong-Gun Moon, Yongin-si (KR); Jae-Woo Bae, Yongin-si (KR); Myun-Gi Shim, Yongin-si (KR); Do-Hyung Park, Yongin-si (KR); Kyu-Chan Park, Yongin-si (KR); Gyeong-Jae Heo, Yongin-si (KR); Sang-Yeol Hur, Yongin-si (KR); Jun-Sik Oh, Yongin-si (KR); Hee-Seong Jeong, Yongin-si (KR); Gun-Shik Kim, Yongin-si (KR); Jae-Kwang Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 880 days.

(21) Appl. No.: 12/121,630

(22) Filed: May 15, 2008

(65) Prior Publication Data

US 2008/0291364 A1 Nov. 27, 2008

(30) Foreign Application Priority Data

May 18, 2007 (KR) .................. 10-2007-0048714

(51) Int. Cl.
*G02F 1/1335* (2006.01)
(52) U.S. Cl. ............... 349/64; 349/62; 359/599; 362/31
(58) Field of Classification Search .................... 349/64; 359/599, 31
See application file for complete search history.

(56) References Cited

U.S. PATENT DOCUMENTS

| 7,218,830 | B2 * | 5/2007 | Iimura ..................... 385/146 |
| 7,320,823 | B2 * | 1/2008 | Kitahara et al. ........... 428/212 |
| 7,438,429 | B2 * | 10/2008 | Matsushita ................ 362/97.1 |
| 7,626,643 | B2 * | 12/2009 | Ijzerman et al. ........... 349/15 |
| 8,023,065 | B2 * | 9/2011 | Epstein et al. ............. 349/62 |
| 2005/0174040 | A1 | 8/2005 | Jung et al. |
| 2005/0184634 | A1 | 8/2005 | Ahn |
| 2006/0181867 | A1 | 8/2006 | Choi et al. |
| 2007/0085467 | A1 | 4/2007 | Cho et al. |

FOREIGN PATENT DOCUMENTS

CN 1255202 A 5/2000

(Continued)

OTHER PUBLICATIONS

Korean Patent Abstracts, Publication 1020060054839 A, Published May 23, 2006, for Choi, et al. European Search Report dated Aug. 22, 2008, for corresponding European application 08156344.7, indicating relevance of references listed in this IDS.
EPO Office Action dated Nov. 1, 2011, for corresponding European Patent Application No. 08 156 344.7, 4 pages.

*Primary Examiner* — Huyen Ngo
(74) *Attorney, Agent, or Firm* — Christie, Parker & Hale, LLP (57) ABSTRACT

A light emission device including: a light emission panel including at least two emissive regions spaced apart from each other and a non-emissive region between the emissive regions; and a light diffuser located in front of the light emission panel, the light diffuser including at least two first diffusion parts corresponding to the emissive regions and a second diffusion part corresponding to the non-emissive region, wherein the second diffusion part has diffusion transmittance that is greater than diffusion transmittance of the first diffusion parts.

16 Claims, 8 Drawing Sheets

FOREIGN PATENT DOCUMENTS

| | | |
|---|---|---|
| CN | 1622267 A | 6/2005 |
| CN | 1956134 A | 5/2007 |
| EP | 1 369 711 A1 | 12/2003 |
| JP | 6-69903 U | 9/1994 |
| JP | 08-160417 | 6/1996 |
| JP | 2004-191490 | 7/2004 |
| JP | 2005-338857 | 12/2005 |
| JP | 2007-003805 | 1/2007 |
| JP | 2007-008808 | 1/2007 |
| JP | 2007-311355 | 11/2007 |
| KR | 10-2006-0054839 | 5/2006 |
| KR | 1020060132431 A | 12/2006 |

* cited by examiner

LIGHT EMISSION DEVICE AND DISPLAY DEVICE USING THE LIGHT EMISSION DEVICE AS A LIGHT SOURCE

CROSS-REFERENCE TO RELATED APPLICATION

This application claims priority to and the benefit of Korean Patent Application No. 10-2007-0048714 filed on May 18, 2007, in the Korean Intellectual Property Office, the entire content of which is incorporated herein by reference.

BACKGROUND OF THE INVENTION

1. Field of the Invention

The present invention relates to a light emission device and a display device, and more particularly, to a light emission device for improving luminance uniformity and a display device using the light emission device as a light source.

2. Description of Related Art

There are many different types of light emission devices that emit visible light. One type of light emission device includes a structure in which an electron emission unit having a plurality of electron emission elements is disposed on a rear substrate and a light emission unit having a phosphor layer and an anode electrode is disposed on a front substrate. The front and rear substrates are sealed to each other at their peripheries using a sealing member, and the inner space between the front and rear substrates is exhausted to form a vacuum vessel (or chamber).

A field emission array (FEA) type of electron emission element and a surface-conduction emission (SCE) type of electron emission element are generally well known. The electron emission elements emit electrons toward the phosphor layer, and the electrons excite the phosphor layer to cause the same to emit visible light. The anode electrode receives a high voltage of a few thousand volts to accelerate the electrons toward the phosphor layer.

The light emission device may be used as a light source in a display device having a passive type (or non-self emissive type) of display panel. In this case, it is required to increase luminance uniformity of the light emission device.

However, when the light emission device is driven, the phosphor layer is divided into a first region that receives high density electrons and a second region that receives low density electrons. While the first region emits high luminance light, the second region emits low or excessively low light. Due to the luminance difference, the conventional light emission device has low luminance uniformity.

The above information disclosed in this Background section is only for enhancement of understanding of the background of the invention, and therefore it may contain information that does not form the prior art that is already known in this country to a person of ordinary skill in the art.

SUMMARY OF THE INVENTION

Exemplary embodiments in accordance with the present invention provide a light emission device that can improve luminance uniformity and a display device using the light emission device as a light source.

An embodiment of the present invention provides a light emission device including: a light emission panel including at least two emissive regions spaced apart from each other and a non-emissive region between the emissive regions; and a light diffuser located in front of the light emission panel, the light diffuser including at least two first diffusion parts corresponding to the emissive regions and a second diffusion part corresponding to the non-emissive region, wherein the second diffusion part has diffusion transmittance that is greater than diffusion transmittance of the first diffusion parts.

The diffusion transmittance of the first diffusion parts may be about 60% to about 80%, and the diffusion transmittance of the second diffusion part may be about 80% to about 100%.

The first diffusion parts and the second diffusion part may include a base layer including a transparent resin and a plurality of light scattering particles; and density of the light scattering particles in the second diffusion part may be greater than density of the light scattering particles in the first diffusion parts.

A volume occupied by the light scattering particles of the first diffusion parts may be about 50% to about 80%, and a volume occupied by the light scattering particles of the second diffusion part may be about 70% to about 100%.

The light emission panel may include: first and second substrates facing each other with a gap therebetween; an electron emission unit located on one side of the first substrate, the electron emission unit including a plurality of electron emission elements; and a light emission unit located on one side of the second substrate, the light emission unit including an anode electrode and a phosphor layer.

The light emission panel may include a plurality of pixel regions, each of the pixel regions having at least one of the electron emission elements, and wherein each of the emissive regions corresponds to each of the pixel regions; and the non-emissive region corresponds to peripheries of the pixel regions.

The at least one of the electron emission elements may include a cathode electrode, a gate electrode crossing the cathode electrode and insulated from the cathode electrode, and at least one electron emission region electrically coupled to the cathode electrode.

The at least one of the electron emission elements may include a first electrode, a second electrode crossing the first electrode and insulated from the first electrode, a first conductive layer coupled to the first electrode, a second conductive layer coupled to the second electrode and spaced apart from the first conductive layer, and an electron emission region between the first and second conductive layers.

Another embodiment of the present invention provides a display device including: a display panel for displaying an image; a light emission panel for emitting light toward the display panel, the light emission panel including at least two emissive regions spaced apart from each other and a non-emissive region between the emissive regions; and a light diffuser located between the display panel and the light emission panel, the light diffuser including at least two first diffusion parts corresponding to the emissive regions and a second diffusion part corresponding to the non-emissive region, wherein the second diffusion part has diffusion transmittance that is greater than diffusion transmittance of the first diffusion parts.

The diffusion transmittance of the first diffusion parts may be about 60% to about 80%, and the diffusion transmittance of the second diffusion part may be about 80% to about 100%.

The first diffusion parts and the second diffusion part may include a base layer including a transparent resin and a plurality of light scattering particles; and density of the light scattering particles at the second diffusion part may be greater than density of the light scattering particles at the first diffusion parts.

An area occupied by the light scattering particles per unit area of the first diffusion parts may be about 50% to about 80%, and an area occupied by the light scattering particles per unit area of the second diffusion part may be about 70% to about 100%.

The light emission panel may include: first and second substrates facing each other with a gap therebetween; an electron emission unit located on one side of the first substrate, the electron emission unit including a plurality of electron emission elements; and a light emission unit located on one side of the second substrate, the light emission unit comprising an anode electrode and a phosphor layer.

The light emission panel may include a plurality of pixel regions, each of the pixel regions having at least one of the electron emission elements, and wherein each of the emissive regions corresponds to each of the pixel regions; and the non-emissive region corresponds to peripheries of the pixel regions.

The display panel may include first pixels and the light emission device comprises second pixels, a number of the second pixels may be less than a number of the first pixels, and luminance of each of the second pixels may be independently controlled.

The display panel may be a liquid crystal display panel.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to those skilled in the art.

In exemplary embodiments of the present invention, all of the light emission devices that emit light to an external side are regarded as light emission devices. Therefore, all display devices that can transmit information by displaying symbols, letters, numbers, and images may be regarded as the light emission devices. In addition, the light emission device may be used as a light source for emitting light to a display panel of a passive type.

A light emission device according to a first exemplary embodiment of the present invention will be described with reference to FIGS. 1 to 4.

Figure 1:
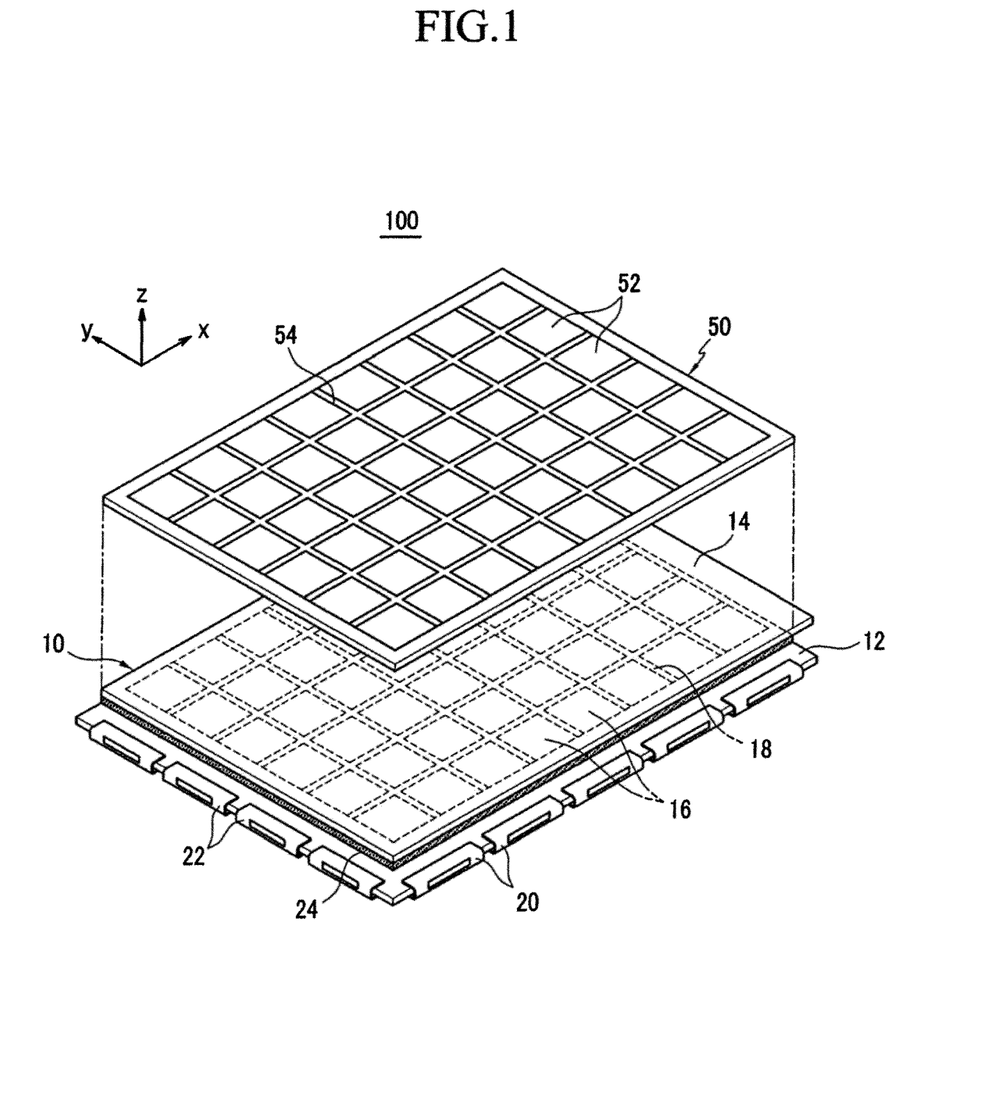
FIG. 1 is an exploded perspective view illustrating a light emission device according to a first exemplary embodiment of the present invention.
Figure 2:
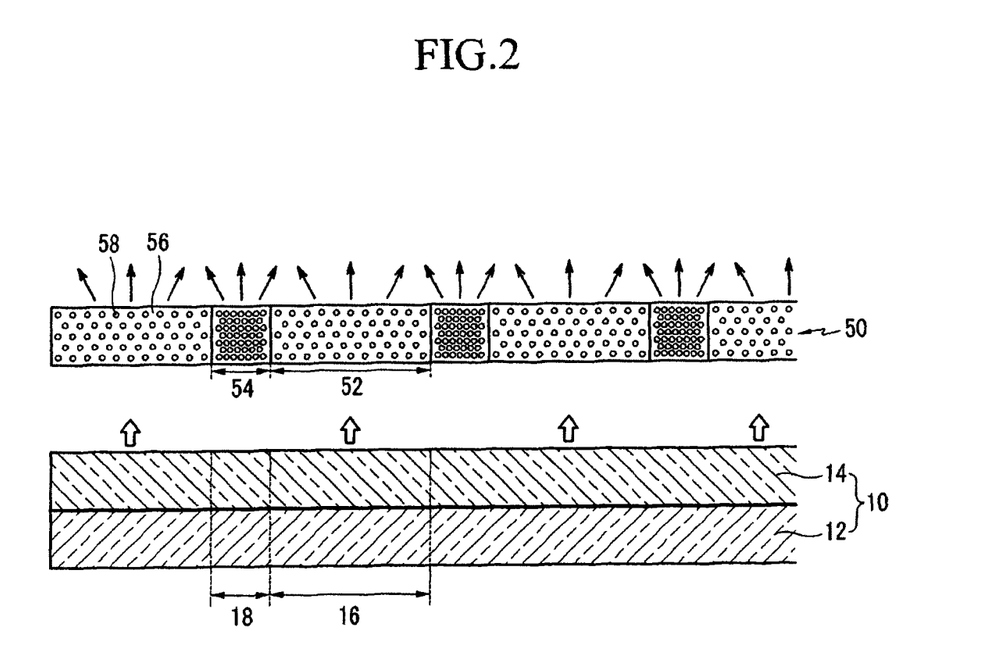
FIG. 2 is a partial sectional view illustrating the light emission device shown in FIG. 1.

Referring to FIGS. 1 and 2, a light emission device 100 of the first exemplary embodiment includes a light emission panel 10 and a light diffuser 50 located in front of the light emission panel 10. The light diffuser 50 is spaced apart from the light emission panel 10 with a distance (e.g., a predetermined distance) therebetween.

The light emission panel 10 includes a first substrate 12 and a second substrate 14 facing each other in a substantially parallel manner with an interval (e.g., a predetermined interval) therebetween. A sealing member 24 is provided between peripheries of the first and second substrates 12 and 14 to seal them together and thus form a vacuum vessel (or chamber). The inner space of the vacuum vessel is kept at a degree of vacuum of about $10^{-6}$ Torr.

The light emission panel 10 further includes first connectors 20 and second connectors 22 for connecting driving electrodes provided inside the light emission panel 10 and circuit board assemblies disposed on the back side of the first substrate 12 to apply driving signals to the driving electrodes.

Figure 3:
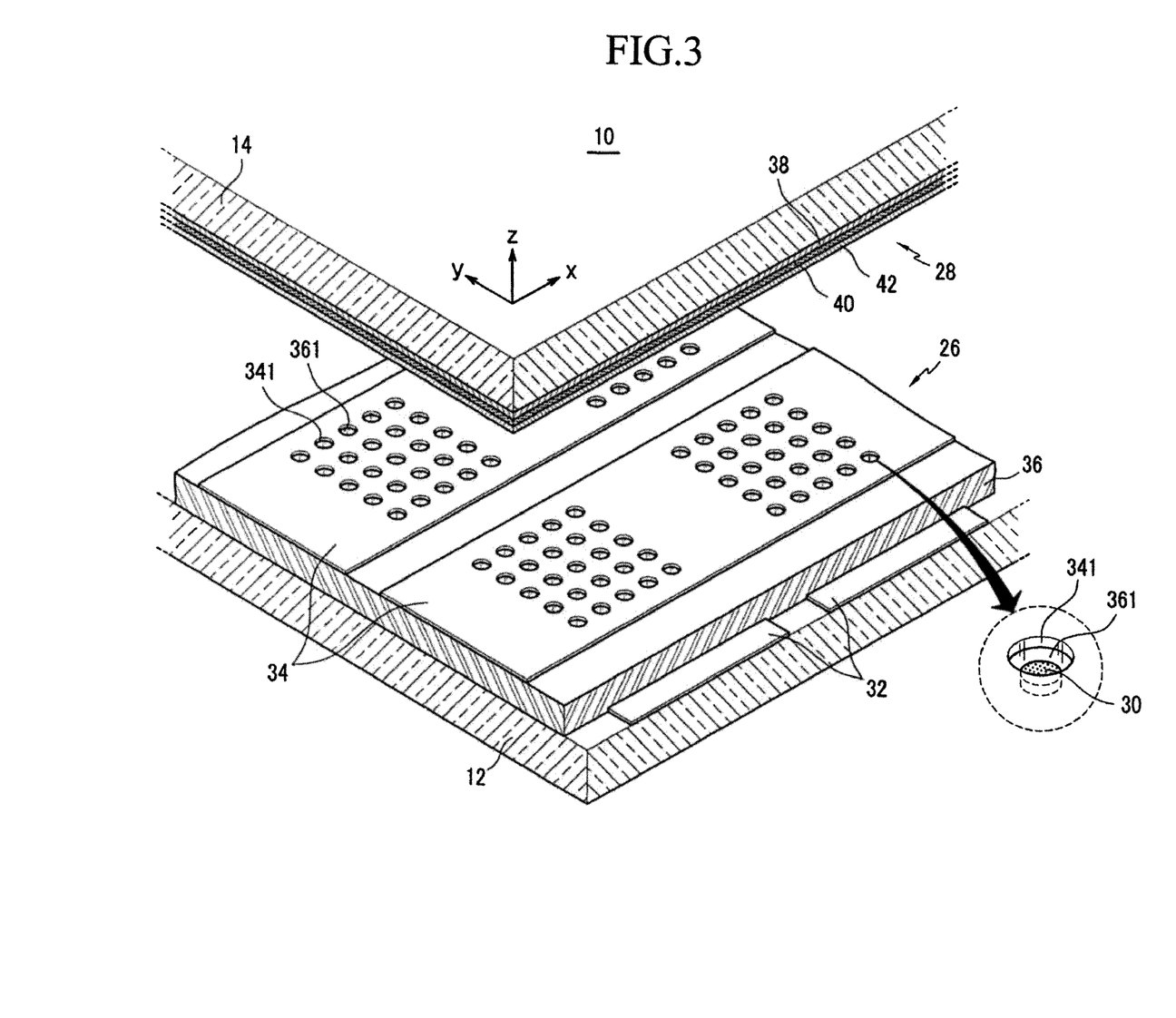
FIG. 3 is a partial cut-away perspective view illustrating an internal structure of an active area in the light emission panel shown in FIG. 1.
Figure 4:
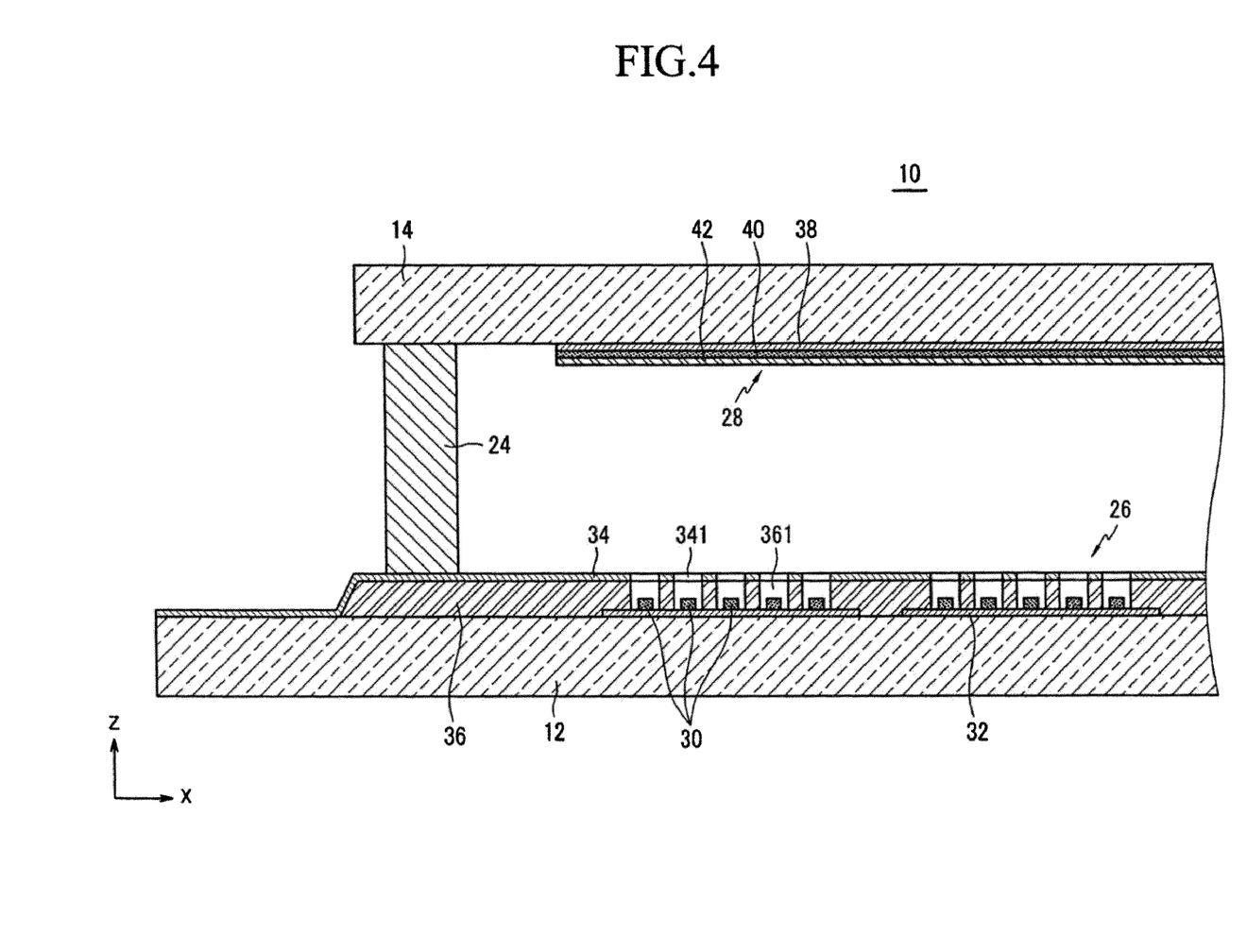
FIG. 4 is a partial sectional view illustrating the light emission panel shown in FIG. 1.

Referring to FIGS. 3 and 4, inside the sealing member 24, each of the first and second substrates 12 and 14 may be divided into an active area from which visible light is actually emitted and a non-active area surrounding the active area. An electron emission unit 26 for emitting electrons is provided on an inner surface of the first substrate 12 at the active area and a light emission unit 28 for emitting visible light is provided on an inner surface of the second substrate 14 at the active area.

The second substrate 14 on which the light emission unit 28 is located may be a front substrate of the light emission panel 10, and the first substrate 12, on which the electron emission unit 26 is located, may be a rear substrate of the light emission panel 10. Disposed between the first substrate 12 and the second substrate 14 are spacers that are able to withstand a compression force applied to the vacuum vessel and to maintain a substantially uniform gap between the first substrate 12 and the second substrate 14.

In the first exemplary embodiment, the electron emission unit 26 includes a plurality of electron emission elements of a field emission array (FEA) type.

The electron emission unit 26 includes electron emission regions 30 and driving electrodes 32 and 34 for controlling an electron emission amount of the electron emission regions 30. The driving electrodes 32 and 34 include cathode electrodes 32 that are arranged in a stripe pattern extending in a first direction (y-axis direction of FIG. 3) of the first substrate 12 and gate electrodes 34 that are arranged in a stripe pattern extending in a second direction (x-axis direction of FIG. 3) substantially perpendicular to the first direction. An insulation layer 36 is interposed between the cathode electrodes 32 and the gate electrodes 34.

Openings 341 and openings 361 are respectively formed in the gate electrodes 34 and the insulation layer 36 at each region where the cathode electrodes 32 and gate electrodes 34 cross each other to partially expose the cathode electrodes 32. The electron emission regions 30 are located on the cathode electrodes 32 in the openings 361 of the insulation layer 36.

The electron emission regions 30 are formed of a material that emits electrons when an electric field is formed therearound under a vacuum atmosphere, such as a carbon-based material or a nanometer-sized material. For example, the electron emission regions 30 may include at least one of materials selected from the group consisting of carbon nanotubes, graphite, graphite nanofibers, diamonds, diamond-like carbon, fullerene ($C_{60}$), silicon nanowires, and combinations thereof.

Alternatively, the electron emission regions 30 may be formed with a sharp tip structure made of a molybdenum-based material or a silicon-based material.

In the above-described structure, one cathode electrode 32, one gate electrode 34, and the electron emission regions 30 located at one crossing region of the cathode and gate electrodes 32 and 34 form a single electron emission element. One electron emission element may correspond to a single pixel region of the light emission panel 10. Alternatively, two or more of the electron emission elements may correspond to the single pixel region of the light emission panel 10.

The light emission unit 28 includes an anode electrode 38, a phosphor layer 40 located on a surface of the anode electrode 38, and a reflection layer 42 covering the phosphor layer 40.

The anode electrode 38 is formed of a transparent conductive material, such as indium tin oxide (ITO), so that visible light emitted from the phosphor layer 40 can transmit through the anode electrode 38. The anode electrode 38 is an acceleration electrode that receives a high voltage (i.e., anode voltage) of thousands of volts or more to place the phosphor layer 40 at a high potential state.

The phosphor layer 40 may be formed of a mixture of red, green, and blue phosphors, which can collectively emit white light. In this case, the phosphor layer 40 may be formed on an entire active area of the second substrate 14 or may be divided into a plurality of sections corresponding to the pixel regions. FIGS. 3 and 4 show a case where the phosphor layer 40 is formed on the entire active area of the second substrate 14.

The reflection layer 42 may be an aluminum layer having a thickness of about several thousands of angstroms (Å) and including a plurality of tiny holes for passing the electrons. The reflection layer 42 functions to enhance the luminance of the light emission panel 10 by reflecting the visible light, which is emitted from the phosphor layer 40 to the first substrate 12, toward the second substrate 14.

The anode electrode 38 formed by the transparent conductive material can be eliminated, and the reflection layer 42 can function as the anode electrode 38 by receiving the anode voltage.

The light emission panel 10 is driven when a scan driving voltage is applied to one of the cathode electrode 32 or the gate electrode 34, a data driving voltage is applied to the other of the cathode electrode 32 or the gate electrode 34, and a positive direction current (DC) anode voltage of thousands of volts or more is applied to the anode electrode 38.

Electric fields are formed around the electron emission regions 30 at the pixels where the voltage difference between the cathode electrode 32 and the gate electrode 34 is equal to or greater than the threshold value, and thus electrons are emitted from the electron emission regions 30. The emitted electrons collide with a corresponding portion of the phosphor layer 40 by being attracted by the anode voltage applied to the anode electrode 38, thereby exciting the phosphor layer 40.

When the phosphor layer 40 is formed on the entire active area of the second substrate 14, certain regions of the phosphor layer 40 that correspond to the pixel regions emit high luminance light by receiving high density electrons from the electron emission elements. On the contrary, the other region of the phosphor layer 40 that corresponds to the peripheries of the pixel regions emits low luminance light by receiving low density electrons from (e.g., diverged from) the electron emission elements.

When the phosphor layer 48 is divided into a plurality of sections corresponding to the pixel regions with a distance (e.g., a predetermined distance) from each other, the light emission panel 10 forms a non-emissive region between the sections of the phosphor layer 48.

Therefore, as shown in FIG. 1, the light emission panel 10 substantially forms a plurality of emissive regions 16 spaced apart from each other and a non-emissive region 18 (or a low-emissive region) disposed between the emissive regions 16 at the active area. The emissive regions 16 correspond to the pixel regions, and the non-emissive region 18 corresponds to the peripheries of the pixel regions. The emissive regions 16 may be spaced apart each other in a row direction (x-axis direction of FIG. 1) and a column direction (y-axis direction of FIG. 1) of the light emission panel 10. The non-emissive region 18 may be formed with a lattice pattern.

Referring to FIGS. 1 and 2, the light diffuser 50 diffuses the light emitted from the light emission panel 10. The light diffuser 50 includes a plurality of first diffusion parts 52 that correspond to the emissive regions 16 of the light emission panel 10 and a second diffusion part 54 that corresponds to the non-emissive region 18 of the light emission panel 10. The light diffuser 50 may be a diffuser plate that can maintain a plate shape.

The first diffusion parts 52 and the second diffusion part 54 include a base layer 56 formed by a transparent resin and a plurality of light scattering particles 58 disposed inside the base layer 56 or disposed on a surface of the base layer 56. The light scattering particles 58 may be microbeads of which light transmittance differs from the light transmittance of the base layer 56. FIG. 2 shows a case where the light scattering particles 58 are disposed inside the base layer 56.

The density of the light scattering particles 58 at the second diffusion part 54 is greater than the density of the light scattering particles 58 at the first diffusion parts 52. Accordingly, diffusion efficiency of the second diffusion part 54 is greater than diffusion efficiency of the first diffusion parts 52. That is, the second diffusion part 54 has diffusion transmittance that is greater than diffusion transmittance of the first diffusion parts 52.

For example, an area volume occupied by the light scattering particles 58 per unit area of the first diffusion parts 52 may be about 50% to about 80%, and the first diffusion parts 52 may have diffusion transmittance of about 60% to about 80%, wherein if the diffusion transmittance is less than about 60%, the luminance uniformity of light emission device 100 may worsen, and if the diffusion transmittance is more than about 80%, a light transmittance of light emission device 100 may decrease. An are occupied by the light scattering particles 58 per unit area of the second diffusion part 54 may be about %70 to about 100%, and the second diffusion part 54 may have diffusion transmittance of about 80% to about 100%.

When the light emitted from the light emission panel 10 passes through the light diffuser 50, the light emitted from the emissive regions 16 is diffused by the first diffusion parts 52. Also, light emitted from the non-emissive region 18 or the boundaries of the emissive regions 16 is diffused by the second diffusion part 54 with a diffusion efficiency that is greater than that of the first diffusion parts 52.

Therefore, a luminance difference between the first diffusion parts 52 and the second diffusion part 54 is decreased, thereby improving the luminance uniformity of the light emission device 100. As a result, the non-emissive region 18 of the light emission panel 10 may be not recognized by a viewer watching the light diffuser 50.

A light emission device according to a second exemplary embodiment of the present invention will be described with reference to FIGS. 5 and 6.

Figure 5:
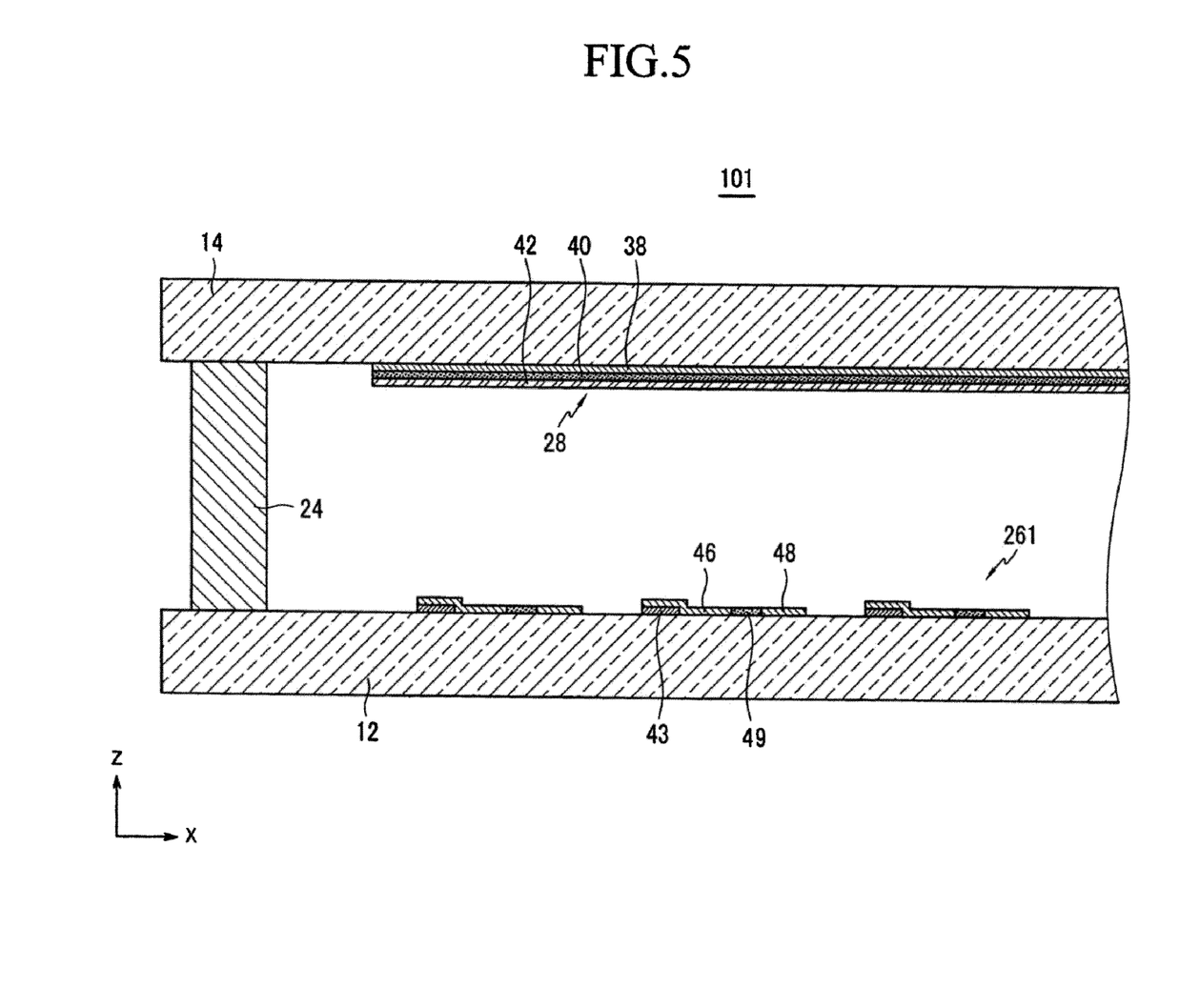
FIG. 5 is a partial sectional view illustrating a light emission panel of a light emission device according to a second exemplary embodiment of the present invention.
Figure 6:
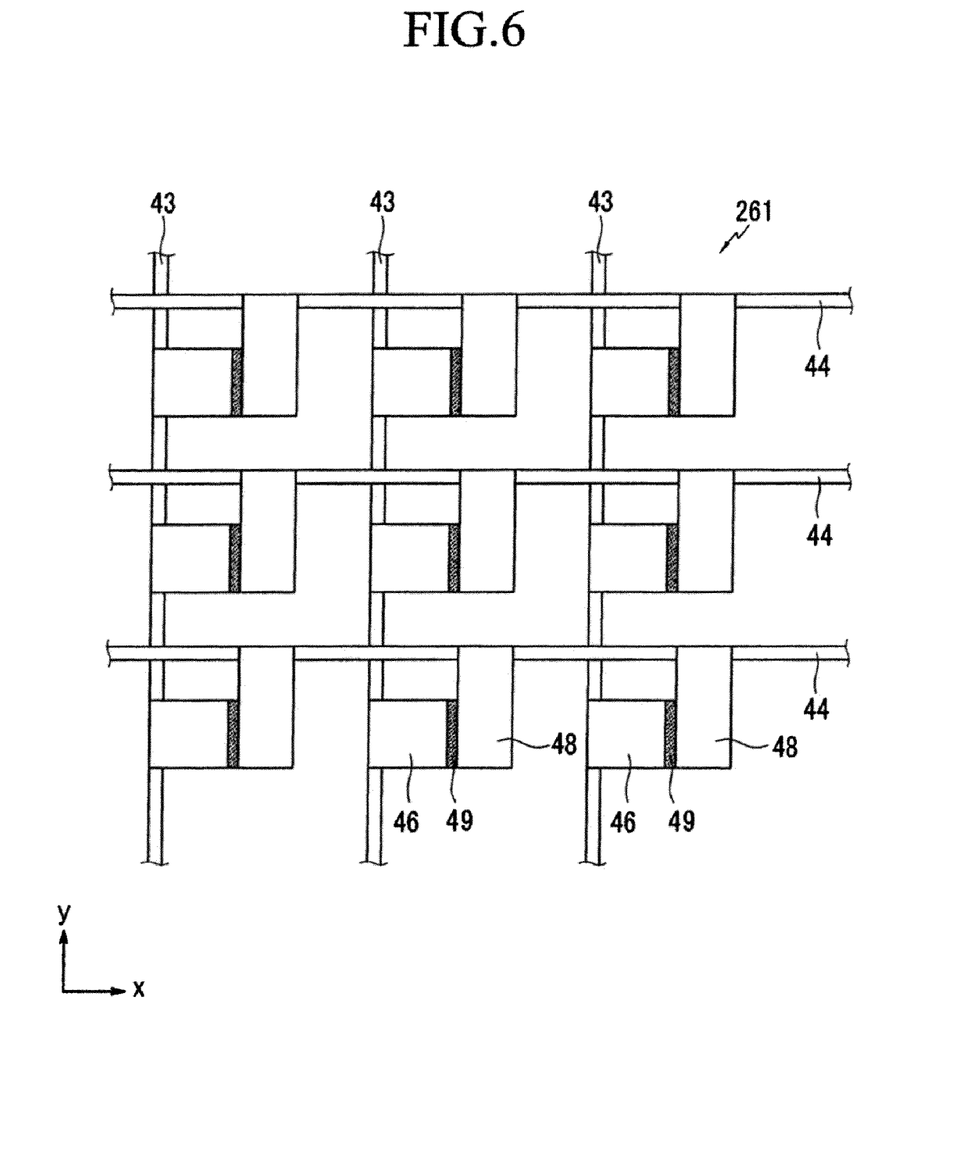
FIG. 6 is a partial top view illustrating an electron emission unit shown in FIG. 5.

Referring to FIGS. 5 and 6, a light emission device 101 according to this exemplary embodiment has the same construction as that of the light emission device 100 according to the first exemplary embodiment except that an electron emission unit 261 includes a plurality of electron emission elements of a surface-conduction emission (SCE) type. The same elements as of the first exemplary embodiment are denoted by the same reference numerals.

The electron emission unit 261 includes first electrodes 43 extended in a first direction (y-axis direction of FIG. 6) of the first substrate 12, second electrodes 44 extended in a second direction (x-axis direction of FIG. 6) substantially perpendicular to the first direction and insulated from the first electrodes 43, first conductive layers 46 coupled to each of the first electrodes 43, second conductive layers 48 coupled to each of the second electrodes 44 and spaced apart from the first conductive layers 46, and electron emission regions 49 disposed between the first conductive layer 46 and the second conductive layer 48.

The electron emission regions 49 may be formed of a carbon-based material. For example, an electron emission region 49 may include at least one of materials selected from the group consisting of carbon nanotubes, graphite, graphite nanofibers, diamond-like carbon, fullerene ($C_{60}$), and combinations thereof. Alternatively, the electron emission region may be formed by fine cracks provided between the first and second conductive layers 46 and 48.

In the above-described structure, one first electrode 43, one second electrode 44, one first conductive layer 46, one second conductive layer 48, and one electron emission region 49 form a single electron emission element. One electron emission element or a plurality of electron emission elements may correspond to the single pixel region of the light emission panel 101.

When voltages are applied to first electrodes 43 and second electrodes 44, a current flows in a direction substantially in parallel with the surface of the electron emission region 49 through the first conductive layer 46 and second conductive layer 48, thereby realizing the surface-conduction emission from the electron emission region 49.

Figure 7:
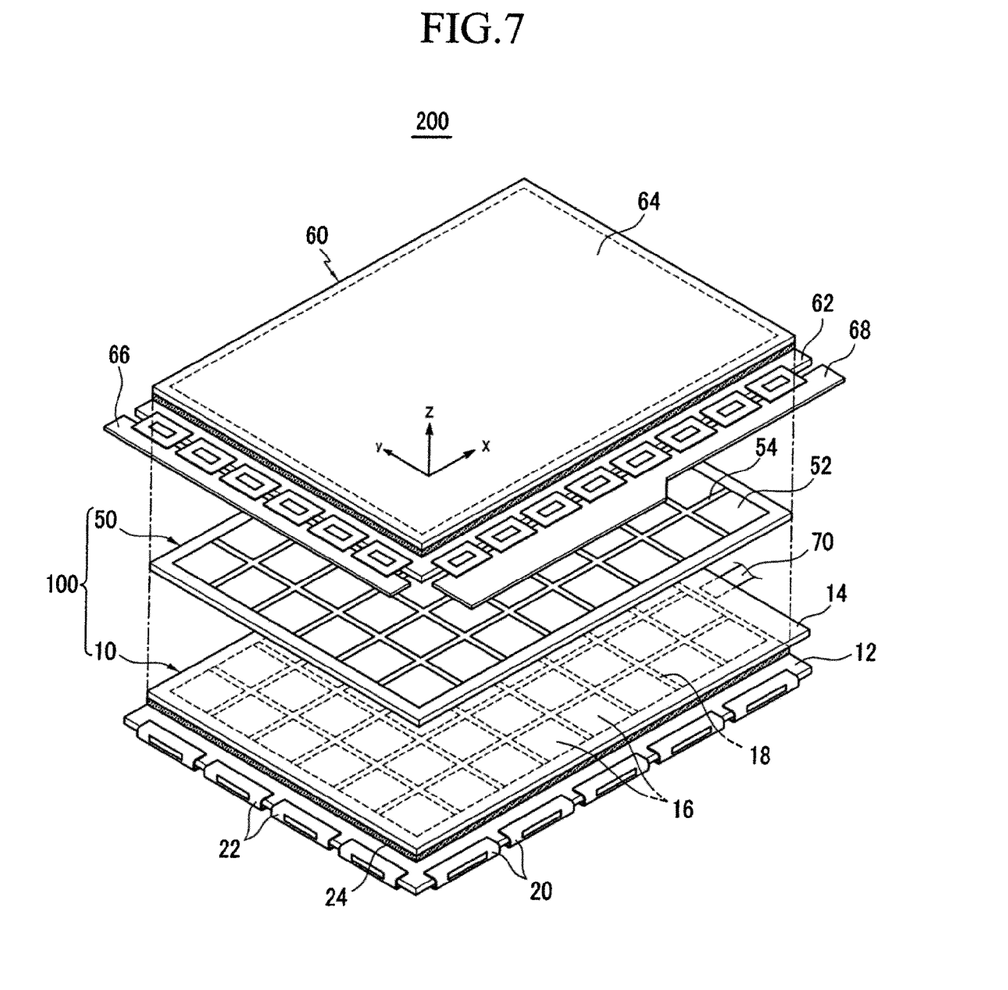
FIG. 7 is an exploded perspective view illustrating a display device according to an exemplary embodiment of the present invention.
Figure 8:
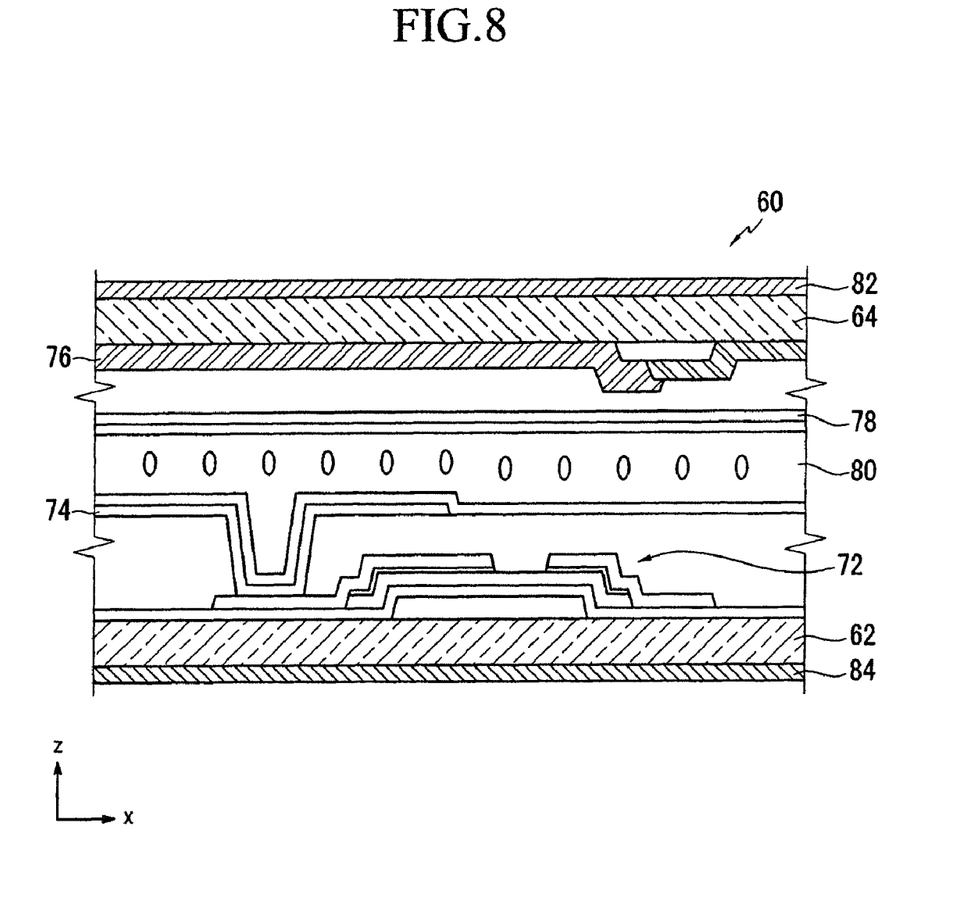
FIG. 8 is a partial sectional view illustrating a display panel of the display device shown in FIG. 7.

The following will describe a display device according to an exemplary embodiment of the present invention with reference to FIGS. 7 and 8. The display device includes the light emission device according to the first exemplary embodiment or the second exemplary embodiment as a light source.

Referring to FIG. 7, a display device 200 of this exemplary embodiment includes a light emission device 100 having a light emission panel 10 and a light diffuser 50, and a display panel 60 located in front of the light emission device 100. A top chassis (not shown) is located in front of the display panel 60 and a bottom chassis (not shown) is located in the rear of the light emission device 100.

A liquid crystal display panel or another passive type (or non-emissive type) display panel may be used as the display panel 60. In the following description, a case where the display panel 60 is a liquid crystal display panel will be explained as an example.

Referring to FIG. 8, the display panel 60 includes a lower substrate 62 on which a plurality of thin film transistors (TFTs) 72 and a plurality of pixel electrodes 74 are formed, an upper substrate 64 on which a color filter layer 76 and a common electrode 78 are formed, and a liquid crystal layer 80 provided between the lower substrate 62 and the upper substrate 64. Polarizing plates 82 and 84 are attached on a top surface of the upper substrate 64 and a bottom surface of the lower substrate 62, respectively, to polarize the light passing through the display panel 60.

A pixel electrode 74 is provided for each sub-pixel, and driving of each pixel electrode is controlled by the TFT 72. The pixel electrodes 74 and the common electrode 78 are formed of a transparent conductive material. The color filter layer 76 includes red, green, and blue layers arranged to correspond to respective sub-pixels. Three sub-pixels, i.e., the red, green, and blue layers that are located side by side, define a single pixel.

When the TFT 72 of a predetermined sub-pixel is turned on, an electric field is formed between the pixel electrode 74 and the common electrode 78. A twisting angle of liquid crystal molecules of the liquid crystal layer 80 is varied, in accordance of which, the light transmittance of the corresponding sub-pixel is varied. The display panel 60 realizes a desired luminance and color for each pixel by controlling the light transmittance of the sub-pixels.

In FIG. 7, reference numeral 66 denotes a gate circuit board assembly for transmitting gate driving signals to each of gate electrodes of the TFTs 72, and reference numeral 68 denotes a data circuit board assembly for transmitting data driving signals to each of the source electrodes of the TFTs 72.

Referring to FIG. 7, the light emission panel 10 includes a plurality of pixels, the number of which is less than the number of pixels of the display panel 60, so that one pixel of the light emission panel 10 corresponds to two or more pixels of the display panel 60. Each pixel of the light emission panel 10 emits light in response to a highest gray level among gray levels of the corresponding pixels of the display panel 60. The light emission panel 10 can represent a gray level of 2 to 8 bits at each pixel.

For convenience, the pixels of the display panel 60 are referred to as first pixels and the pixels of the light emission panel 10 are referred to as second pixels. The first pixels corresponding to one second pixel are referred to as a first pixel group.

In a driving process of the light emission panel 10, a signal control unit that controls the display panel 60 (i) detects the highest gray level of the first pixel group, (ii) determines a gray level required for emitting light from the second pixel in response to the detected high gray level and converts the gray level into digital data, (iii) generates a driving signal of the light emission panel 10 using the digital data, and (iv) applies the driving signal to the light emission panel 10.

The driving signal of the light emission panel 10 includes a scan driving signal and a data driving signal. One of the cathode and gate electrodes (e.g., the gate electrodes) are applied with the scan driving signal and the other (e.g., the cathode electrodes) are applied with a data driving signal.

Scan and data circuit board assemblies (not shown) of the light emission panel 10 may be located on a rear surface of the light emission panel 10. In FIG. 7, reference numeral 20 denotes first connectors for electrically coupling the cathode electrodes and the data circuit board assembly and reference numeral 22 denotes second connectors for electrically coupling the gate electrodes and the scan circuit board assembly. Reference numeral 70 denotes a third connector for applying an anode voltage to the anode electrode.

When an image is displayed on the first pixel group, the corresponding second pixel of the light emission panel 10 emits light with a predetermined gray level by synchronizing with the first pixel group. That is, the light emission panel 10 independently controls the luminance of each pixel, and thus provides a proper intensity of light to the corresponding pixels of the display panel 60 in proportion to the luminance of the first pixel group. As a result, the display device 200 of the present exemplary embodiment can enhance the contrast ratio of the screen, thereby improving the display quality.

Although exemplary embodiments of the present invention have been described in detail hereinabove, it should be clearly understood that many variations and/or modifications of the basic inventive concept taught herein still fall within the spirit and scope of the present invention, as defined by the appended claims and their equivalents.

What is claimed is:

1. A light emission device comprising:
   a light emission panel comprising at least two emissive regions spaced apart from each other and a low-emissive region between the emissive regions; and
   a light diffuser located in front of the light emission panel, the light diffuser comprising at least two first diffusion parts corresponding to the emissive regions and a second diffusion part corresponding to the low-emissive region,
   wherein the second diffusion part has diffusion transmittance that is greater than diffusion transmittance of the first diffusion parts;
   wherein the first diffusion parts and the second diffusion part comprise a plurality of light scattering particles, and
   wherein density of the light scattering particles in the second diffusion part is greater than density of the light scattering particles in the first diffusion parts.

2. The light emission device of claim 1, wherein the diffusion transmittance of the first diffusion parts is about 60% to about 80%, and the diffusion transmittance of the second diffusion part is about 80% to about 100%.

3. The light emission device of claim 1, wherein the first diffusion parts and the second diffusion part comprise a base layer comprising a transparent resin and the plurality of light scattering particles.

4. The light emission device of claim 3, wherein an area occupied by the light scattering particles per unit area of the first diffusion parts is about 50% to about 80%, and an area occupied by the light scattering particles per unit area of the second diffusion part is about 70% to about 100%.

5. The light emission device of claim 1, wherein the light emission panel comprises:
   first and second substrates facing each other with a gap therebetween;
   an electron emission unit located on one side of the first substrate, the electron emission unit comprising a plurality of electron emission elements; and
   a light emission unit located on one side of the second substrate, the light emission unit comprising an anode electrode and a phosphor layer.

6. The light emission device of claim 5, wherein the light emission panel comprises a plurality of pixel regions, each of the pixel regions having at least one of the electron emission elements, and
   wherein each of the emissive regions corresponds to each of the pixel regions; and the low-emissive region corresponds to peripheries of the pixel regions.

7. The light emission device of claim 6, wherein the at least one of the electron emission elements comprises a cathode electrode, a gate electrode crossing the cathode electrode and insulated from the cathode electrode, and at least one electron emission region electrically coupled to the cathode electrode.

8. The light emission device of claim 6, wherein the at least one of the electron emission elements comprises a first electrode, a second electrode crossing the first electrode and insulated from the first electrode, a first conductive layer coupled to the first electrode, a second conductive layer coupled to the second electrode and spaced apart from the first conductive layer, and an electron emission region between the first and second conductive layers.

9. A display device comprising:
   a display panel for displaying an image;
   a light emission panel for emitting light toward the display panel, the light emission panel comprising at least two emissive regions spaced apart from each other and a non-emissive region low-emissive region between the emissive regions; and
   a light diffuser located between the display panel and the light emission panel, the light diffuser comprising at least two first diffusion parts corresponding to the emissive regions and a second diffusion part corresponding to the low-emissive region,
   wherein the second diffusion part has diffusion transmittance that is greater than diffusion transmittance of the first diffusion parts;
   wherein the first diffusion parts and the second diffusion part comprise a plurality of light scattering particles, and
   wherein density of the light scattering particles in the second diffusion part is greater than density of the light scattering particles in the first diffusion parts.

10. The display device of claim 9, wherein the diffusion transmittance of the first diffusion parts is about 60% to about 80%, and the diffusion transmittance of the second diffusion part is about 80% to about 100%.

11. The display device of claim 9, wherein the first diffusion parts and the second diffusion part comprise a base layer comprising a transparent resin and the plurality of light scattering particles.

12. The display device of claim 11, wherein an area occupied by the light scattering particles per unit area of the first diffusion parts is about 50% to about 80%, and an area occupied by the light scattering particles per unit area of the second diffusion part is about 70% to about 100%.

13. The display device of claim 9, wherein the light emission panel comprises:
   first and second substrates facing each other with a gap therebetween;
   an electron emission unit located on one side of the first substrate, the electron emission unit comprising a plurality of electron emission elements; and
   a light emission unit located on one side of the second substrate, the light emission unit comprising an anode electrode and a phosphor layer.

14. The display device of claim 13, wherein the light emission panel comprises a plurality of pixel regions, each of the pixel regions having at least one of the electron emission elements, and
   wherein each of the emissive regions corresponds to each of the pixel regions; and the low-emissive region corresponds to peripheries of the pixel regions.

15. The display device of claim 9, wherein the display panel comprises first pixels and the light emission panel comprises second pixels, a number of the second pixels is less than a number of the first pixels, and luminance of each of the second pixels is independently controlled.

16. The display device of claim 9, wherein the display panel is a liquid crystal display panel.

* * * * *